United States Patent [19]

Seabourn

[11] 4,413,688
[45] Nov. 8, 1983

[54] DIVERTER VALVE

[76] Inventor: Joe M. Seabourn, 301 Birch St., Apt. 248, Lafayette, La. 70506

[21] Appl. No.: 271,002

[22] Filed: Jun. 5, 1981

[51] Int. Cl.³ .............................................. E21B 21/10
[52] U.S. Cl. ..................................... 175/38; 175/218; 166/364; 137/529; 137/535; 137/542
[58] Field of Search .................... 175/209, 38; 166/86, 166/87, 88, 95, 100, 325, 326; 137/529, 540, 542

[56] References Cited

U.S. PATENT DOCUMENTS

| 1,753,024 | 4/1930 | Rode | 137/529 |
| 2,245,210 | 6/1941 | McElwaine | 166/95 X |
| 2,879,794 | 3/1959 | Costello | 137/542 |
| 2,954,742 | 10/1960 | Williams | 166/88 X |
| 3,744,751 | 7/1973 | Robinson | 137/540 X |
| 3,917,008 | 11/1975 | Suter | 175/38 |
| 4,308,916 | 1/1982 | Fritz, Jr. | 166/88 X |

Primary Examiner—Ernest R. Purser
Assistant Examiner—Joseph Falk
Attorney, Agent, or Firm—Henry C. Nields

[57] ABSTRACT

Diverter valve for preventing blow-outs in oil wells during the early stages of drilling. The diverter valve has a simplified construction which reduces maintenance problems during use in the field.

3 Claims, 2 Drawing Figures

DIVERTER VALVE

BACKGROUND OF THE INVENTION

1. Field of the Invention

This invention relates to the prevention of blow-outs in oil wells during the early stages of drilling when conventional blow-out preventers which seal the well are of limited effectiveness owing to the tendency of the unwanted fluid to force itself up outside the casing. More specifically this invention provides a diverter valve of simplified construction which reduces maintenance problems during use in the field.

2. Description of the Prior Art

A type of diverter valve currently in use for the purpose of preventing blow-outs during the early stages of drilling is described in U.S. Pat. No. 3,917,008. The problems which such a diverter valve is designed to solve are set forth in that patent, and the invention described and claimed in that patent is a diverter valve which is opened and closed by the movement of a piston within a cylindrical sleeve. The piston has a mud-contact end against which is exerted the back-pressure at the surface of the annulus between the drill string and the casing. The other end of the piston is a biased end against which controllable gas pressure is exerted. The cylindrical sleeve has a mud diverter conduit extending from a diverted-mud outlet opening in the side of the cylindrical sleeve. In the closed position, the piston covers the outlet opening. When abnormally high pressure is encountered at the bottom of the well, the resultant high pressure at the surface of the annulus between the drill string and the casing overcomes the opposing pressure being exerted against the biased end of the piston so as to move it within the cylindrical sleeve in such a manner as to uncover the diverted-mud outlet opening, permitting the mud to escape through the mud diverter conduit.

While the diverter valve of said U.S. patent is of elegant construction, it is unsuited to the rugged conditions in the field which are characteristic of oil well drilling rigs. The various parts of such diverter valves tend to be corroded by the moist gases encountered during operation of the rig, and improper operation often results during use for these and other reasons. The repairs needed to correct such improper operation are difficult to carry out, and the replacement parts required are difficult to obtain. There is nothing delicate in an oil field operation, and components used on drilling rigs are preferably of rugged construction, easy to repair. The diverter valve of the prior art, as shown in said U.S. patent and as currently used in the field, is very complicated, using nitrogen pressure and elaborate components. However, it is not rugged; it is easily damaged; and it is difficult to fix it in the field. It has close tolerances, and cement gets into the device and jams it. It is also jammed when wet air gets into it instead of nitrogen.

SUMMARY OF THE INVENTION

The diverter valve of my invention overcomes these problems of the prior art diverter valves, and provides a diverter valve which is cheaper to fix, does not jam, is easy to adjust in the field, and employs replacement parts which are readily available and inexpensive. The diverter valve of my invention is of simple, spring-loaded construction wherein the only wearing action between moving parts is that between a rubber gasket and a beveled valve seat. The movement of the rubber gasket is against and away from the beveled valve seat, thereby minimizing frictional forces. The rubber gasket is of black, hard, synthetic rubber, such as Neoprene, and constitutes a component which is cheap and readily available. The spring which is used to provide the spring-loading force is also inexpensive, and is preferably relatively "mushy" so that it provides a relatively yieldable, rather than stiff, opposition to the back-pressure forces in the annulus between the drill string and the casing.

BRIEF DESCRIPTION OF THE DRAWINGS

My invention may best be understood from the following detailed description thereof, having reference to the accompanying drawings, in which.

DETAILED DESCRIPTION OF A PREFERRED EMBODIMENT OF THE INVENTION

Figure 1:
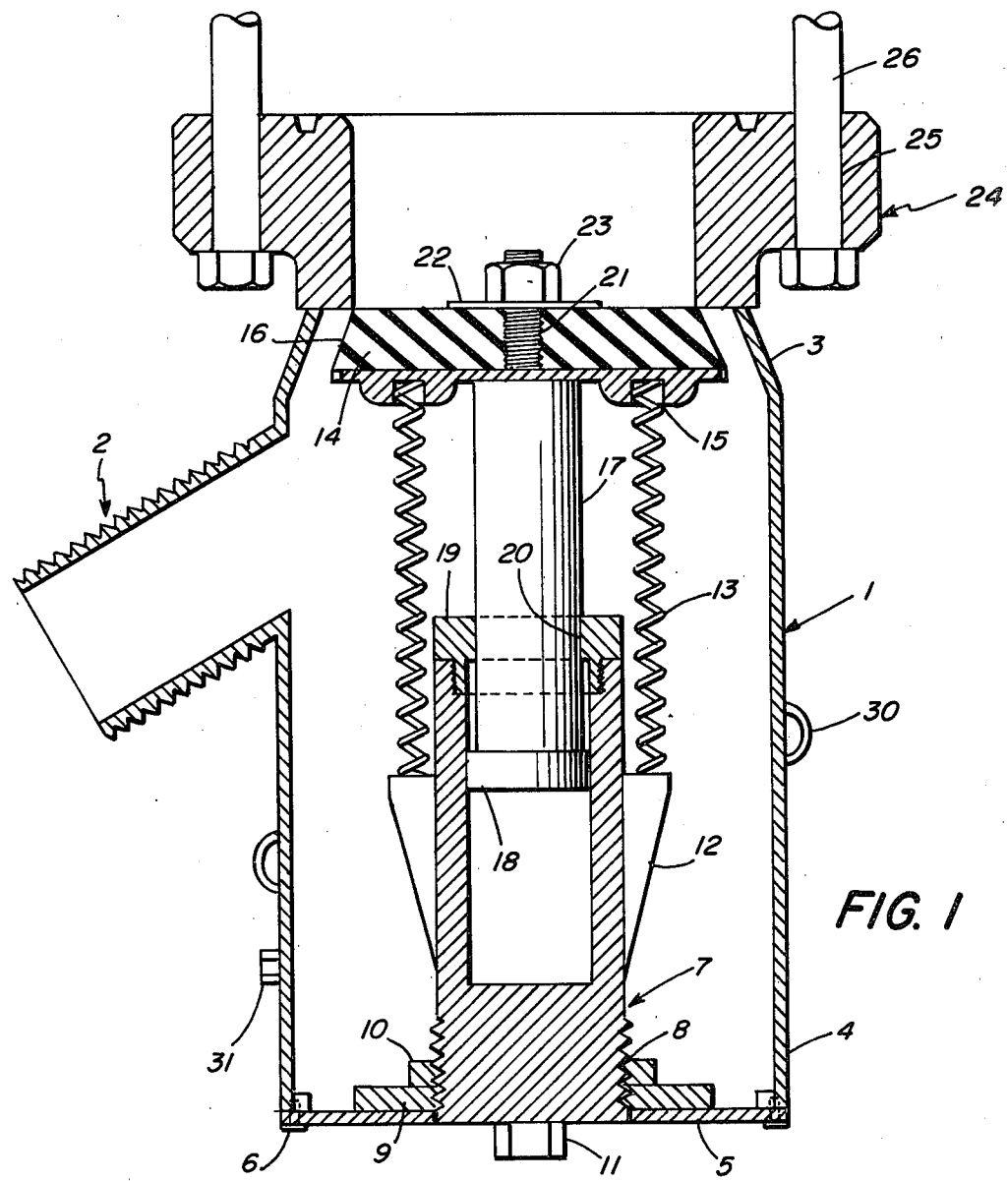
FIG. 1 is a vertical central section of a diverter valve constructed in accordance with my invention.

Referring to the drawings, and first to FIG. 1 thereof, the diverter valve of my invention includes housing 1 which is generally cylindrical except for an exhaust port 2 extending laterally therefrom at an angle (such as 45°) to the axis of the housing 1. The upper portion 3 of the housing 2 is tapered inwardly, and the exhaust port 2 joins the cylindrical part of the housing 1 near this tapered upper portion 3. The outer surface of the exhaust port 2 is threaded. The lower extremity 4 of the housing 1 is closed off by a plate 5 which is bolted to the housing 1 by a suitable number of bolts 6 (such as 6) preferably equally spaced around the circumference of the housing 1. Each bolt 6 preferable has a lock nut built in.

The center of the plate 5 is apertured so as to receive a cup 7 which is threaded at the exterior of the base 8 thereof so as to engage corresponding threads on the inner surface of flanges 9, 10 which abut against the plate 5. The position of the cup 7 within the housing 1 may thus be adjusted in the axial direction by rotation of the cup 7. For this purpose there is provided a square or hex nut 11 which is firmly affixed to the base 8 of the cup 7. Above the threaded portion of the cup 7 there is welded or otherwise affixed thereto a shoulder 12 which acts as a stop against a solid coil spring 13 extending from the shoulder 12 upwardly beyond the upper end of the cup 7. The upper end of the spring 13 is engaged by a molded rubber gasket 14 having a circular groove 15 in its lower surface adapted to receive the upper end of the spring 13, and having a tapered periphery 16. Lateral stability is imparted to the gasket 14 by a guide member 17 having a flange 18 at its lower extremity which slidably engages the interior of the cup 7. Lateral stability is further enhanced by a threaded cap 19 which is screwed into the top of the cup 7 and has an internal flange 20 which slidably engages the shaft of the guide member 17. The guide member is affixed to the gasket 14 by a threaded member 21 which passes through the center of the gasket 14, through a washer 22, and is held in place by a nut 23.

The upper lateral surface of the gasket 14 is pressed by the spring 13 against the lower surface of an API (American Petroleum Institute) standard flange 24 which is welded or otherwise affixed to the upper portion 3 of the housing 1. The standard flange 24 includes bolt holes 25 adapted to receive bolts 26 by means of which the diverter valve is attached to the section 28 above the conductor pipe 29, as shown in FIG. 2.

The tapered periphery 16 of the rubber gasket 14 is preferably tapered to an angle of about 30° to the axis of the housing 1, and the portion of the lower surface of the standard flange 24 against which the rubber gasket 14 is pressed by the spring 13 is preferably beveled to the same angle in order to provide a tight seal.

The housing 1 may have affixed thereto one or more lifting eyes 30 and one or more washplugs 31.

Figure 2:
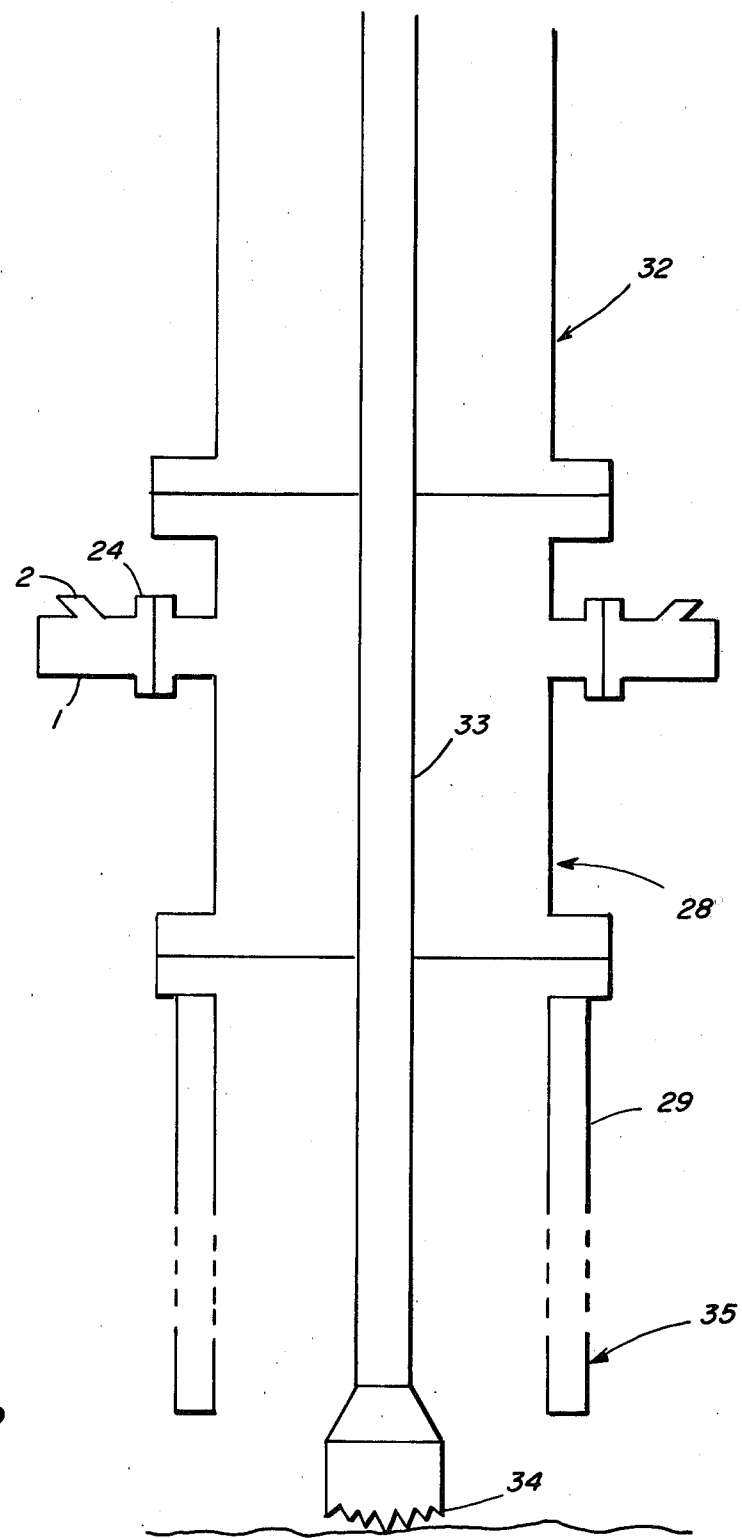
FIG. 2 is a somewhat diagrammatic view, mainly in vertical central section, of an oil well having attached thereto a pair of diverter valves of my invention.

Referring now to FIG. 2, therein is shown the conductor pipe 29, the upper section 28, and the superstructure 32 of the oil well rig, together with the drill pipe 33 and the bit 34 at the bottom thereof. During drilling operation, the drilling mud is delivered to the interior of the drill pipe 33 at the surface of the earth, and it flows down through the drill pipe 33, out in the vicinity of the bit 34, and back up the pipe casing system 35 on the inside of the casings 35 but on the outside of the drill pipe 33, and on back up to the surface of the earth, where it is recycled back down through the drill pipe 33.

Under static conditions the pressure along the column of mud within the casing system 35 is a linear function of depth, and the pressure (in pounds per square foot) at any depth is equal to the product of the density of the mud (in pounds per cubic feet) times the depth (in feet). This is true of the mud within the drill pipe 33 as well as of the mud between the drill pipe 33 and the casing system 35. Under dynamic conditions, a pump 36 forces the mud down through the drill pipe 33, so that the mud travels in the manner described above.

When the bit 34 drills through into a shallow formation of high pressure, the high-pressure gas thus encountered pushes against the drilling mud, and tends to push it upwards, mainly within the casing system 35, but also to a certain extent outside it. The increase in pressure is transmitted along the entire length of the column, traveling with the velocity of sound. The diverter valve of the invention is opened by this increase in pressure, and thus gives the drilling mud access to the outer atmosphere through the diverter valve itself. When the diverter valve opens, the mud can escape therethrough, thereby not only relieving the increase in pressure, but also providing a controlled exit for the mud.

Since the signal which opens the diverter valve (namely, the movement of the increase in pressure up the column) travels with the speed of sound, and since the actual movement of drilling mud must be very much less than this, the diverter valve is opened long before there can be any appreciable movement of drilling mud.

While the pressure at the bottom of the well depends upon the depth of the bottom, the pressure at the top is only atmospheric pressure, plus such added pressure as may be due to the pump 36. The crucial moment for the rig with respect to the dangers of striking a high-pressure shallow cavity in the earth, is when the depth goes past that at which 30-inch casing (i.e., conductor pipe) is used, to that at which 20-inch casing is used. When the well has been drilled deeper than that at which 20-inch casing is used, ram-type blowout-preventers will have been installed and provide adequate protection. Conductor pipe is usually about 200 feet long, and so the crucial time begins at a depth of about 200 feet and continues until the 20-inch casing has been installed and cemented. Thus the pressure at the bottom of the well during the crucial time, assuming drilling mud of a density of 10 pounds per gallon, will vary between 103.9 pounds per square inch and some greater value (depending on the length of the 20-inch casing), plus the additional pressure imposed by the pump 36. Owing to the viscosity of the drilling mud and other factors, if the pump exerts an additional pressure of several hundred pounds per square inch at the output of the pump, the additional pressure imposed by the pump will be less the further one goes from the pump. Thus, as one moves down the interior of the drill pipe 33 the additional pressure imposed by the pump falls (although the actual pressure within the drilling mud increases, due to the weight of the drilling mud), and it continues to fall as one moves up again outside the drill pipe 33 and within the casing system 35. Consequently, the actual pressure at the diverter valves may not be very much greater than atmospheric pressure.

Since the lower side of the rubber gasket is exposed to the atmosphere, the spring 13 need only exert sufficient pressure so as to overcome the additional pressure imposed by the pump 36.

Normally one can assume that the restoring force exerted by an elastic body, such as the spring 13, which has been displaced, is proportional to the displacement, so that (Restoring force) = (k) times (displacement) where k is a constant. However, k is not necessarily a constant, and in the case of the diverter valve of the invention, it is preferable that the spring 13 be so constructed that the value of k decrease with increasing displacement, so that the restoring force of the spring 13 which pushes against the rubber gasket 14 declines rapidly as soon as the valve is opened by a pressure surge caused by the bit 34 drilling into a shallow high-pressure cavity. The threaded base 8, in cooperation with the threads on the inner surface of the flanges 9, 10, is rotatably adjusted in order to provide the proper pressure from the spring 13 against the gasket 14 so as to oppose pressures normally encountered during operation. Then, when abnormally high pressure is encountered, the spring 13 should yield readily. In other words, the spring 13 should be very soft, or "mushy".

In accordance with my invention, I may also provide means by which the operator of the drilling rig may open the diverter valve at will, either to increase the rapidity of opening when high pressure is encountered, or for any other purpose.

The standard flange 24 acts as a valve seat for the rubber gasket 14, and so the inner edge 40 of the standard flange 24 which constitutes the valve seat is beveled at an angle of about 30° to the axis of the housing 1 so as to match the tapered periphery 16 of the gasket 14. As a result of this tapered and beveled configuration, the compression of the gasket 14 against the valve seat 40 will continue to effect a complete closure during normal pressure conditions in the oil well, even after a certain amount of wear at the mating surfaces.

I claim:

1. A diverter valve for preventing blow-outs, during the early stages of drilling, which can be caused by sudden pressure surges encountered by the drilling bit in drilling an oil well, by rapid release of said pressure surges prior to forced movement of unwanted fluid up outside the casing comprising, in combination, a housing having an inlet aperture and an exhaust aperture the exterior whereof is free from any obstruction to the movement of fluidized solid materials therethrough, a rubber gasket adapted to close said inlet aperture, a spring mounted within said housing so as to engage said gasket and press it against said inlet aperture so as to close it, said exhaust aperture being located in the vicinity of the annulus formed when said rubber gasket is moved away from said inlet aperture in such a direction as to compress said spring, the size of said exhaust aperture being sufficiently great and location of said exhaust aperture being sufficiently close to said inlet aperture so as freely to release drilling mud and other fluidized solid materials from said annulus, and means for adjusting the compression of said spring so as to compensate for the normal pressure of drilling mud at said inlet aperture during the drilling operation, said adjusted compression being insufficient to compensate for the pressure of drilling mud at said inlet aperture upon arrival at said inlet aperture of any pressure wave caused by excess pressure encountered at the bottom of the well during the drilling operation.

2. A diverter valve for preventing blow-outs, during the early stages of drilling, which can be caused by sudden pressure surges encountered by the drilling bit in drilling an oil well, by rapid release of said pressure surges prior to forced movement of unwanted fluid up outside the casing comprising, in combination, a housing having a main cylindrical passageway therethrough, said main cylindrical passageway having a first end and a second end, said housing having a branch cylindrical passageway which branches off from said main cylindrical passageway near said first end and at an angle to the axis of said main cylindrical passageway and ends in an exhaust aperture the exterior whereof is free from any obstruction to the movement of fluidized solid materials therethrough, a valve seat affixed to and facing said first end, an end plate affixed to and closing said second end, a spring mounted upon said end plate, and a rubber gasket mounted upon said spring, the mounting of said spring and said rubber gasket being such that said rubber gasket is compressed against and engages said valve seat, the size of said exhaust aperture being sufficiently great, and the location of said exhaust aperture being sufficiently close to said valve seat so as freely to release drilling mud and other fluidized solid materials discharged through said valve seat upon release of said rubber gasket.

3. Blow-out prevention apparatus for preventing blow-outs, during the early stages of drilling, which can be caused by sudden pressure surges encountered by the drilling bit in drilling an oil well, by rapid release of said pressure surges prior to forced movement of unwanted fluid up outside the casing comprising, in combination:

a surface casing, mud circulation means associated with said casing, and mud diverter valve means connected with said casing, said valve means comprising:

a housing having a main cylindrical passageway therethrough, said main cylindrical passageway having a first end (which leads into said casing) and a second end, said housing having a branch cylindrical passageway which branches off from said main cylindrical passageway near said first end and at an angle to the axis of said main cylindrical passageway and ends in an exhaust aperture the exterior whereof is free from any obstruction to the movement of fluidized solid materials therethrough, a valve seat affixed to and facing said first end, an end plate affixed to and closing said second end, a spring mounted upon said end plate, and a rubber gasket mounted upon said spring, the mounting of said spring and said rubber gasket being such that said rubber gasket is compressed against and engages said valve seat when the back pressure in said casing is normal, but is lifted away from said valve seat when the back pressure in said casing is abnormally high, the size of said exhaust aperture being sufficiently great, and the location of said exhaust aperture being sufficiently close to said valve seat so as freely to release drilling mud and other fluidized solid materials discharged through said valve seat upon release of said rubber gasket.

* * * * *